United States Patent [19]

Yamaguchi

[11] Patent Number: 5,291,803
[45] Date of Patent: Mar. 8, 1994

[54] AUTOMOTIVE VEHICLE CONTROLLING APPARATUS WITH FAILURE JUDGING FACILITY

[75] Inventor: Hiroshi Yamaguchi, Yokohama, Japan

[73] Assignee: Nissan Motor Co., Ltd., Yokohama, Japan

[21] Appl. No.: 832,930

[22] Filed: Feb. 11, 1992

[30] Foreign Application Priority Data

Feb. 14, 1991 [JP] Japan .................. 3-40832

[51] Int. Cl.$^5$ .............................................. F16H 61/12
[52] U.S. Cl. .................................................. 74/866
[58] Field of Search .......................................... 74/866

[56] References Cited

U.S. PATENT DOCUMENTS

| | | | |
|---|---|---|---|
| 4,667,541 | 5/1987 | Shimaoka et al. | 74/866 |
| 4,833,613 | 5/1989 | Mack et al. | 74/866 |
| 4,903,551 | 2/1990 | Hiramatsu et al. | 74/866 X |
| 4,918,606 | 4/1990 | Ito et al. | 74/866 X |
| 4,922,425 | 5/1990 | Mack et al. | 74/866 X |
| 4,945,484 | 7/1990 | Cote et al. | 74/866 X |
| 4,955,258 | 9/1990 | Ito et al. | 74/866 X |
| 4,969,099 | 11/1990 | Iwatsuki et al. | 74/866 X |
| 4,981,052 | 1/1991 | Gierer | 74/866 |
| 4,991,096 | 2/1991 | Glowczewski et al. | 74/866 X |
| 5,016,174 | 5/1991 | Ito et al. | 74/866 X |
| 5,033,328 | 7/1991 | Shimanaka | 74/866 |
| 5,088,353 | 2/1992 | Yoshida | 74/866 |
| 5,117,711 | 6/1992 | Iizuka | 74/866 |
| 5,142,945 | 9/1992 | Shimanaka | 74/866 |
| 5,193,417 | 3/1993 | Niiyama et al. | 74/866 |

*Primary Examiner*—Dirk Wright
*Attorney, Agent, or Firm*—Foley & Lardner

[57] ABSTRACT

An apparatus for controlling an automotive vehicle includes a plurality of sensors for detecting operational conditions of the vehicle and for producing condition signals which are received by a plurality of control units. The control units produce control signals in response to which a plurality of actuators control the operations of the vehicle. In order to judge failures of the sensors, a managing unit is provided separately from the control units and the condition signals generated by the sensors are supplied to the managing unit. In the managing unit, a failure judging process is performed by using the condition signals in combination to derive a judgment result.

18 Claims, 7 Drawing Sheets

FIG_1A

FIG_1B

FIG_2

FIG_6

AUTOMOTIVE VEHICLE CONTROLLING APPARATUS WITH FAILURE JUDGING FACILITY

BACKGROUND OF THE INVENTION

Field of the Invention

The present invention relates to an automotive vehicle controlling apparatus comprising a plurality of sensors for detecting operational conditions of the automotive vehicle to generate condition signals, at least one electronic control unit for processing the condition signals generated by said sensors to produce at least one control signal, and at least one actuator for controlling the operation of the automotive vehicle in response to said control signal.

Description of the Related Art

In the above mentioned automotive vehicle controlling apparatus, operational conditions of the automotive vehicle are detected by a plurality of sensors and output condition signals of these sensors are supplied to at least one electronic control unit which processes these condition signals to produce at least one control signal, and at least one actuator is controlled in accordance with the control signal. A typical example of such a controlling apparatus is that used in an automatic transmission. Such an automatic transmission controlling apparatus has been described in a service manual for a "full range electronically controlled automatic transmission RE5R-01A" issued by NISSAN MOTOR CO. LTD. In this automatic transmission controlling apparatus, there is provided an automatic transmission control unit to which are connected various kinds of sensors such as an idle switch for detecting the fully-closed condition of a throttle valve to produce an idle signal, a full throttle switch for detecting the fully-opened condition of the throttle valve to produce a full throttle signal, a throttle sensor for detecting an open angle of the throttle valve to produce a throttle valve open angle signal, and an engine running speed sensor for detecting the running speed of the engine to produce an engine running speed signal. These signals are supplied to the automatic transmission control unit and are processed thereby to produce control signals. The thus produced control signals are supplied to actuators of the automatic transmission to control its operation in accordance with the control signals. The known automatic transmission control unit also has a function which detects or judges failures of the sensors. However, in the known controlling apparatus, the failure judgement is carried out by using only condition signals which are supplied to the relevant control unit in order to perform given control which is destined for the relevant control unit, so that the judgement is liable to be simple and it is difficult to effect the failure judgement in an accurate and reliable manner. For instance, consider the case in which the automatic transmission control unit executes such a failure judgement for the throttle sensor. When the throttle sensor generates a condition signal having a level above a predetermined reference level for a predetermined time period while the idle switch is kept on (fully closed condition), it is concluded that the throttle sensor is out of order. This failure judgement is based on the fact that the throttle sensor is more likely to be out of order than the idle switch, which has a rather simple construction when compared with the throttle sensor. Therefore, in the known automatic transmission controlling apparatus for use in an automotive vehicle, when the idle switch is stuck or closed due to any reason, the throttle sensor is erroneously judged to be out of order even if it is operating normally. In this manner, the known automotive controlling apparatus could not perform the failure judgement accurately, so that erroneous judgements occur, and a high degree of reliability in making a failure judgement has not heretofore been attained.

SUMMARY OF THE INVENTION

The present invention has for its object to provide a novel and useful automotive vehicle controlling apparatus with failure judging faculty, in which a failure judgement can be performed accurately and a possibility of erroneous judgement can be reduced by processing various condition signals generated by various sensors in combination.

It is another object of the invention to provide an automotive vehicle controlling apparatus, in which one or more correct condition signals related to one or more sensors which are judged to be abnormal can be derived from condition signals generated from sensors which are judged to be normal.

According to the invention, an automotive vehicle controlling apparatus with failure judging faculty comprises:

- a sensing means including a plurality of sensors for detecting operational conditions of the automobile vehicle to generate a plurality of condition signals;
- a signal processing means including at least one electronic control unit which receives and processes at least one of said plurality of condition signals to generate at least one control signal;
- actuating means including at least one actuator which controls the automotive vehicle in response to said at least one control signal generated by said signal processing means; and
- a managing means for receiving information related to said plurality of condition signals generated by said sensing means and processing totally the information to judge a failure of at least one sensor in the sensing means and/or at least one actuator in the actuating means.

According to the invention, the managing means is provided for exclusively performing the failure judgement and a plurality of sensors are coupled to the managing means directly or via the electronic control unit, and the failure judgement result is produced by processing totally the information related to a plurality of condition signals. Therefore, the failure judgement can be performed accurately and the reliability of the failure judgement can be improved.

In a preferable embodiment of the controlling apparatus according to the present invention, said managing means is directly coupled with said plurality of sensors to receive the condition signals generated by the sensors, and the failure judgement is performed by processing the condition signals in combination in accordance with a predetermined judging process.

In another embodiment of the controlling apparatus according to the invention, the control unit is constructed to form information related to the condition signals generated by said sensors and said managing means is coupled with said electronic control unit to receive the information. Then the failure judgement is conducted by processing the information supplied from the electronic control unit.

In another preferable embodiment of the controlling apparatus according to the invention, the managing means is constructed such that when one or more sensors are judged to be out of order, correct condition signals related to the sensors which are judged to be abnormal are derived from condition signals which are generated by sensors which are judged to be normal. Then the automotive vehicle can be controlled accurately by using the thus generated correct condition signals instead of condition signals which are actually generated by the sensors which are judged to be abnormal.

DESCRIPTION OF THE PREFERRED EMBODIMENTS

Figure 1A:
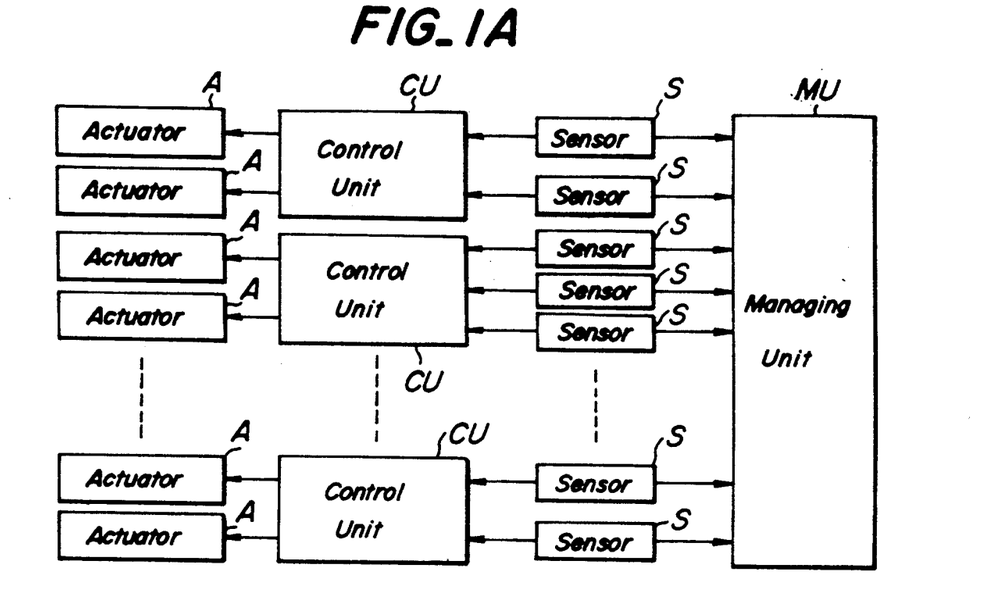
FIGS. 1A and 1B are block diagrams showing two principal constructions of the automotive vehicle controlling apparatus according to the invention.
Figure 1B:
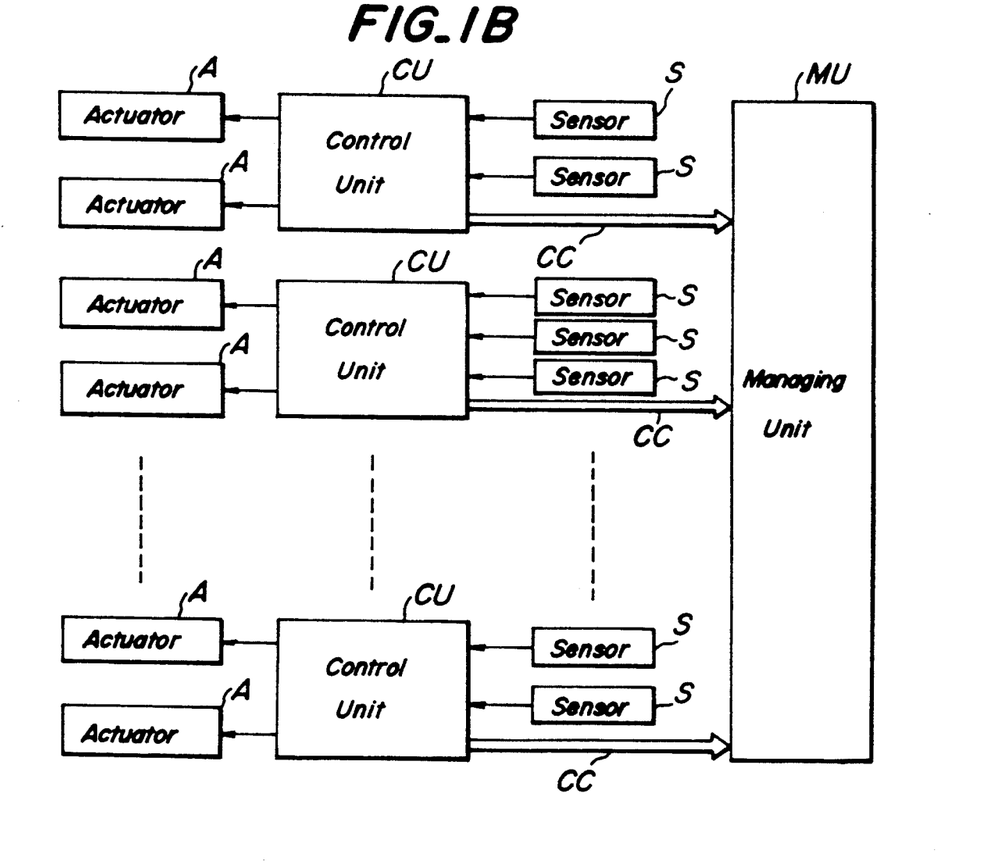

FIGS. 1A and 1B are block diagrams showing two principal construction of the automotive vehicle controlling apparatus according to the invention. In FIG. 1A, the automotive vehicle controlling apparatus comprises a plurality of sensors S for detecting various operational conditions of a vehicle to generate condition signals, and a plurality of electronic control units CU which are connected to the sensors S to receive the condition signals generated by the sensors. The electronic control units CU process these condition signals to produce control signals. These control signals are supplied to a plurality of actuators A for controlling various operations of the automotive vehicle in response to the control signals. In the principal construction illustrated in FIG. 1A, a managing unit MU is directly coupled with the sensors S to receive the condition signals generated by the sensors. The managing unit MU processes these condition signals in combination to judge failures of constructional elements of the controlling apparatus, i.e. sensors and actuators. In this embodiment, the electronic control units CU send control signals to the actuators A to perform given controls for the automotive vehicle, and at the same time the condition signals generated by the sensors S are supplied to the managing unit MU. The managing unit MU processes the condition signals in combination and judges the occurrence of failures in the controlling apparatus and positions of the failures. In case of judging the failures, the managing unit MU processes a plurality of the condition signals in combination in accordance with a predetermined judging theory and/or majority decision to produce a fail judgement result. In this manner, the above mentioned drawback of the known controlling apparatus can be removed and the reliability in the failure judgement can be improved to a great extent.

In the principal construction shown in FIG. 1B, the managing unit MU is coupled with the electronic control units CU via communication circuits CC and receives information which is formed by the control units in accordance with the condition signals generated by the sensors S. The managing unit MU processes the thus received information to determine or judge failures in the controlling apparatus, i.e. an occurrence of failures in the controlling apparatus and points or positions of failures. In this principal construction, the managing unit MU also performs the failure judgement by totally taking into account of the information supplied from the control units CU, and thus the failure judgement can be performed accurately and its reliability is improved.

Upon comparing the construction shown in FIG. 1B with that depicted in FIG. 1A, the connections between respective sensors S and the managing unit MU can be dispensed with, so that a capacity of harness can be saved to a great extent.

Figure 2:
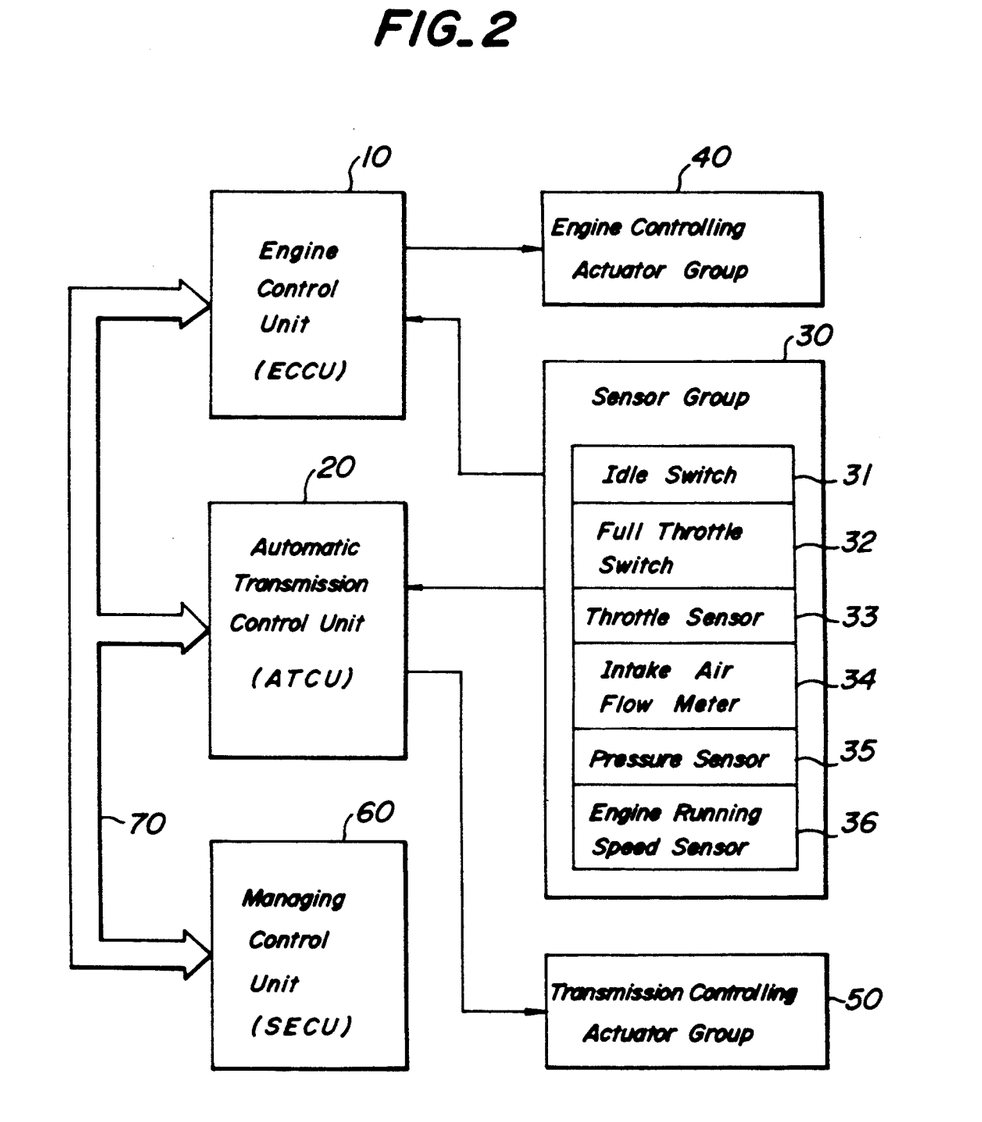
FIG. 2 is a block diagram depicting an embodiment of the automotive vehicle controlling apparatus according to the present invention.

FIG. 2 is a block diagram illustrating an embodiment of the automotive vehicle controlling apparatus according to the present invention. In FIG. 2, a reference numeral 10 denotes an engine control unit (ECCS) for controlling an electronically controlled engine and 20 represents an automatic transmission control unit (ATCU). ECCS 10 and ATCU 20 are connected to a sensor group 30 including a plurality of sensors for detecting various operational conditions of an automotive vehicle. Various condition signals generated by the sensor group 30 are supplied to ECCS 10 as well as to ATCU 20. ECCS 10 processes these condition signals to produce various control signals which are supplied to an engine control actuator group 40. Similarly ATCU 20 processes the condition signals and produces a plurality of control signals which are supplied to an automatic transmission controlling actuator group 50. Since the control for the engine and automatic transmission has been known and is not essential for the present invention, this is not explained here in detail.

The sensor group 30 includes an idle switch 31 for detecting a fully closed condition of an engine throttle valve provided in the engine, a full throttle switch 32 for detecting a fully opened condition of the throttle valve, a throttle sensor 33 for detecting an open angle TH of the throttle valve, an air flow meter 34 for detecting an intake air flow rate Q, a pressure sensor 35 for detecting a negative pressure P within an intake manifold collector, and an engine rotation speed sensor 36 for detecting an engine running speed $N_E$.

In the present embodiment, there is further provided a managing electronic control unit (SECU) 60 for performing the failure judgement. SECU 60 is coupled with ECCS 10 and ATCU 20 by means of a communication circuit (communication line) 70. SECU 60 receives information related to the condition signals generated by the sensors in the sensor group 30, and performs a control program shown in FIG. 3 to effect the judgement of the occurrence of failures in the sensor group 30 of the controlling apparatus. In the present embodiment, the operating conditions of the sensors 31 to 35 are judged.

Figure 3:
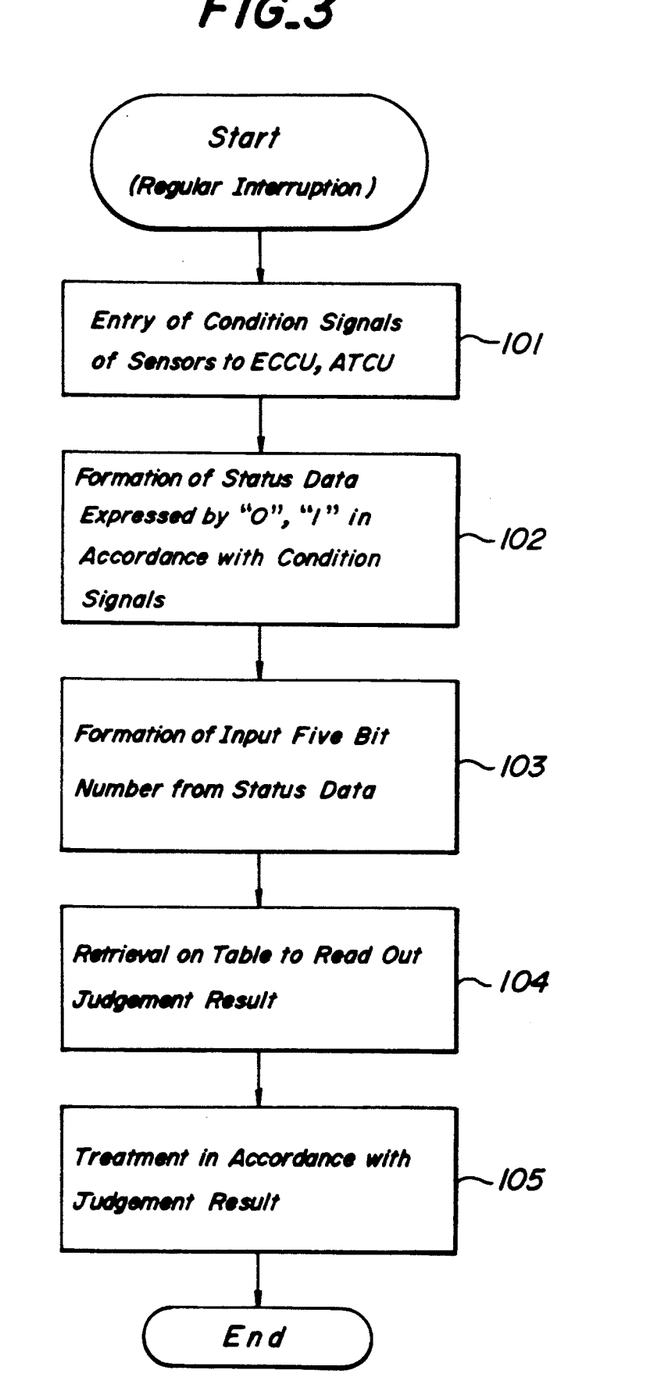
FIG. 3 is a flow chart explaining the operation of the controlling apparatus shown in FIG. 2.

FIG. 3 is a flow chart showing successive steps of the judging operation which is executed repeatedly by the managing control unit 60 at a regular time interruption. At first, in a step 101, the condition signals generated by the sensors 31 to 36 are supplied to ECCS 10 and ATCU 20, and in a next step 102, ECCS 10 and ATCU 20 form status data in accordance with the condition signals generated by these sensors 31 to 35. In the present embodiment, each of the status data is represented by one bit, i.e. logic "1" or "0". That is to say, when a condition signal indicates an operation which drives the throttle valve in the closing direction, i.e. in the direction of reducing the engine output power, logic "0" is allocated for the status data related to a sensor which generates the relevant condition signal, and when the condition signal represents an operation for opening the throttle valve, i.e. in the direction of increasing the engine output power, the relevant status data is denoted by logic "1". Therefore, when the condition signal generated by the idle switch 31 represents that the throttle valve is fully closed, logic "0" is given for the status data related to the idle switch 31 and when the idle switch is in an off-state, logic "1" is allotted to this status data. When the condition signal generated by the full throttle switch 32 indicates that the throttle valve is not fully opened, logic "0" is allotted for the status data related to the full throttle switch, while when the full throttle switch is on, the status data related to this full throttle switch is represented by logic "1". When the throttle sensor 33 produces an output signal which indicates that an open angle of the throttle valve is smaller than a predetermined angle $TH_0$, logic "0" is allocated for the status data related to the throttle sensor, and when the output signal is equal to or larger than said predetermined value, logic "1" is allotted. When the intake air flow meter 34 produces an output signal which is smaller than a predetermined threshold value $Q_0$, logic "0" is allocated to the status data related to the air flow meter, and when the output signal $|P|$ is equal to Or larger than $Q_0$, logic "1" is allotted. When an absolute value of the negative pressure detected by the pressure sensor 35 is equal to or smaller than a predetermined threshold level $P_0$, the status data related to the pressure sensor is expressed by logic "0", and when the absolute value is larger than the threshold value, logic "1" is allocated to this status data. The thus produced status data represented by logic "0" and "1" are supplied from ECCS 10 and ATCU 20 to SECU 60 via the communication circuit 70.

In a next step 103, SECU 60 forms an input five bit number which is composed of the five status data of the above mentioned five sensors 31 to 35. In this case, there are thirty two possible numbers of five bit as shown in the following table ($32=2^5$). In each numbers, the most significant bit (left hand bit) denotes the status data related to the idle switch 31, a next bit the status data of the full throttle switch 32, a third bit the status data related to the throttle sensor 33, a fourth bit the status data of the intake air flow meter 34 and the least significant bit (right hand bit) represents the status date related to the pressure sensor 35.

TABLE

| Situation No. | Input five bit number | | | | | Output five bit number | | | | | Judgement result |
|---|---|---|---|---|---|---|---|---|---|---|---|
| | 31 | 32 | 33 | 34 | 35 | | | | | | |
| 1 | 0 | 0 | 0 | 0 | 0 | 0 | 0 | 0 | 0 | 0 | Normal |
| 2 | 0 | 0 | 0 | 0 | 1 | 0 | 0 | 0 | 0 | 1 | #35 down |
| 3 | 0 | 0 | 0 | 1 | 0 | 0 | 0 | 0 | 1 | 0 | #34 down |
| 4 | 0 | 0 | 0 | 1 | 1 | 0 | 0 | 0 | 1 | 1 | #34, 35 down |
| 5 | 0 | 0 | 1 | 0 | 0 | 0 | 0 | 1 | 0 | 0 | #33 down |
| 6 | 0 | 0 | 1 | 0 | 1 | 0 | 0 | 1 | 0 | 1 | #33, 35 down |
| 7 | 0 | 0 | 1 | 1 | 0 | 0 | 0 | 1 | 1 | 0 | #33, 34 down |
| 8 | 0 | 0 | 1 | 1 | 1 | 1 | 1 | 0 | 0 | 0 | #31, 32 down |
| 9 | 0 | 1 | 0 | 0 | 0 | 0 | 1 | 0 | 0 | 0 | #32 down |
| 10 | 0 | 1 | 0 | 0 | 1 | 0 | 1 | 0 | 0 | 1 | #32, 35 down |
| 11 | 0 | 1 | 0 | 1 | 0 | 0 | 1 | 0 | 1 | 0 | #32, 34 down |
| 12 | 0 | 1 | 0 | 1 | 1 | 1 | 0 | 1 | 0 | 0 | #31, 33 down |
| 13 | 0 | 1 | 1 | 0 | 0 | 0 | 1 | 1 | 0 | 0 | #32, 33 down |
| 14 | 0 | 1 | 1 | 0 | 1 | 1 | 0 | 0 | 1 | 0 | #31, 34 down |
| 15 | 0 | 1 | 1 | 1 | 0 | 1 | 0 | 0 | 0 | 1 | #31, 35 down |
| 16 | 0 | 1 | 1 | 1 | 1 | 1 | 0 | 0 | 0 | 0 | #31 down |
| 17 | 1 | 0 | 0 | 0 | 0 | 0 | 0 | 0 | 0 | 0 | Normal |
| 18 | 1 | 0 | 0 | 0 | 1 | 0 | 0 | 0 | 0 | 1 | #35 down |
| 19 | 1 | 0 | 0 | 1 | 0 | 0 | 0 | 0 | 1 | 0 | #34 down |
| 20 | 1 | 0 | 0 | 1 | 1 | 0 | 0 | 1 | 0 | 0 | #33 down |
| 21 | 1 | 0 | 1 | 0 | 0 | 0 | 0 | 1 | 0 | 0 | #33 down |
| 22 | 1 | 0 | 1 | 0 | 1 | 0 | 0 | 0 | 1 | 0 | #34 down |
| 23 | 1 | 0 | 1 | 1 | 0 | 0 | 0 | 0 | 0 | 1 | #35 down |
| 24 | 1 | 0 | 1 | 1 | 1 | 0 | 0 | 0 | 0 | 0 | Normal |
| 25 | 1 | 1 | 0 | 0 | 0 | 1 | 1 | 0 | 0 | 0 | #31, 32 down |
| 26 | 1 | 1 | 0 | 0 | 1 | 0 | 0 | 1 | 1 | 0 | #33, 34 down |
| 27 | 1 | 1 | 0 | 1 | 0 | 0 | 0 | 1 | 0 | 1 | #33, 35 down |
| 28 | 1 | 1 | 0 | 1 | 1 | 0 | 0 | 1 | 0 | 0 | #33 down |
| 29 | 1 | 1 | 1 | 0 | 0 | 0 | 0 | 0 | 1 | 1 | #34, 35 down |
| 30 | 1 | 1 | 1 | 0 | 1 | 0 | 0 | 0 | 1 | 0 | #34 down |
| 31 | 1 | 1 | 1 | 1 | 0 | 0 | 0 | 0 | 0 | 1 | #35 down |
| 32 | 1 | 1 | 1 | 1 | 1 | 0 | 0 | 0 | 0 | 0 | Normal |

In this table, the five bit number is analyzed in accordance with a given logic and the condition of the switches and sensors is judged on the basis of the majority decision theory. For instance, in a situation No. 1, the five bit number is 00000. This represents a condition in which the idle switch 31 is on, full throttle switch 32 is off, the output of the throttle sensor 33 is smaller than $TH_0$, the output of the intake air flow meter 34 is smaller than $Q_0$ and the absolute value of the negative pressure detected by the pressure sensor 35 is larger than $P_0$. This condition is normal, so that a judgement result denotes that all the sensors 31 to 35 are normal. In the present embodiment, the judgement result is produced by an output five bit number in which logic "o" bit represents a normal operation and logic "1" bit denotes a malfunction. Therefore, when it is judged that all the sensors 31 to 35 are normal, an output five bit number of 00000 is produced as the judgement result. Similarly a condition represented by a situation No. 32 occurs normally, so that in such a case an output five bit number of 00000 is also produced.

In a situation No. 7 in which an input five bit number of 00110 is formed from the condition signals generated by the sensors 31 to 35, it can be judged that the throttle sensor 33 and intake air flow meter 34 become out of order, because a possibility that three or more than three sensors among the five sensors 31 to 35 become out of order simultaneously is very small. Then, an output five bit number of 00110 indicating that the sensors 33 and 34 are abnormal is produced as a judgement result. In this manner, in the present embodiment, the failure judgement is carried out by the majority decision principle. That is to say, as shown in situations Nos. 5 and 28, when one bit of the input five bit number differs from the remaining four bits, it is judged that a sensor whose status data differs from the remaining sensors is out of order. When two bits of an input five bit number are different from the remaining three bits (for instance, situations Nos. 4 and 29), it can be judged that two sensors related to these two bits become out of order.

In a normal operation, there are cases in which the idle switch 31 is off (logic "1") and the full throttle switch 32 is also off (logic "0") as shown by situations Nos. 17 to 24. That is to say, in a middle throttle range, such a situation can occur. In such cases, if the majority decision principle is applied as it is, there might be erroneous judgements. For instance, when an input five bit number is 10000 as shown in situation No. 17, it might be judged that the idle switch 31 becomes out of order although this idle switch operates normally. In order to avoid such erroneous judgements, in the present embodiment the failure condition is judged in accordance with the majority decision while the status data of the two higher bits of the five bit number, i.e. the status data of the idle switch 31 and full throttle switch 32 are ignored. Then, in a situation No. 23 (input five bit number is 10110), the condition of the pressure sensor 35 can be judged to be abnormal, so that an output five bit number of 00001 indicating that the pressure sensor 35 is out of order is produced. In this manner, the table contains all the possible input five bit numbers and the judgement results each represented by output five bit numbers.

In a next step 104, an input five bit number formed by the status data sent from ECCU 10 and ATCU 20 is retrieved on the table to find a situation which includes the corresponding input five bit number and an output five bit number included in the retrieved situation is read out and is produced as a judgement result. For instance, when the input five bit number is formed by 10011, then a situation No. 20 is retrieved and an output five bit number of 00100 indicating that the throttle sensor 33 is out of order is read out of the relevant situation No. 20, and this output five bit number is supplied to a utilizing circuit as a judgement result.

Figure 6:
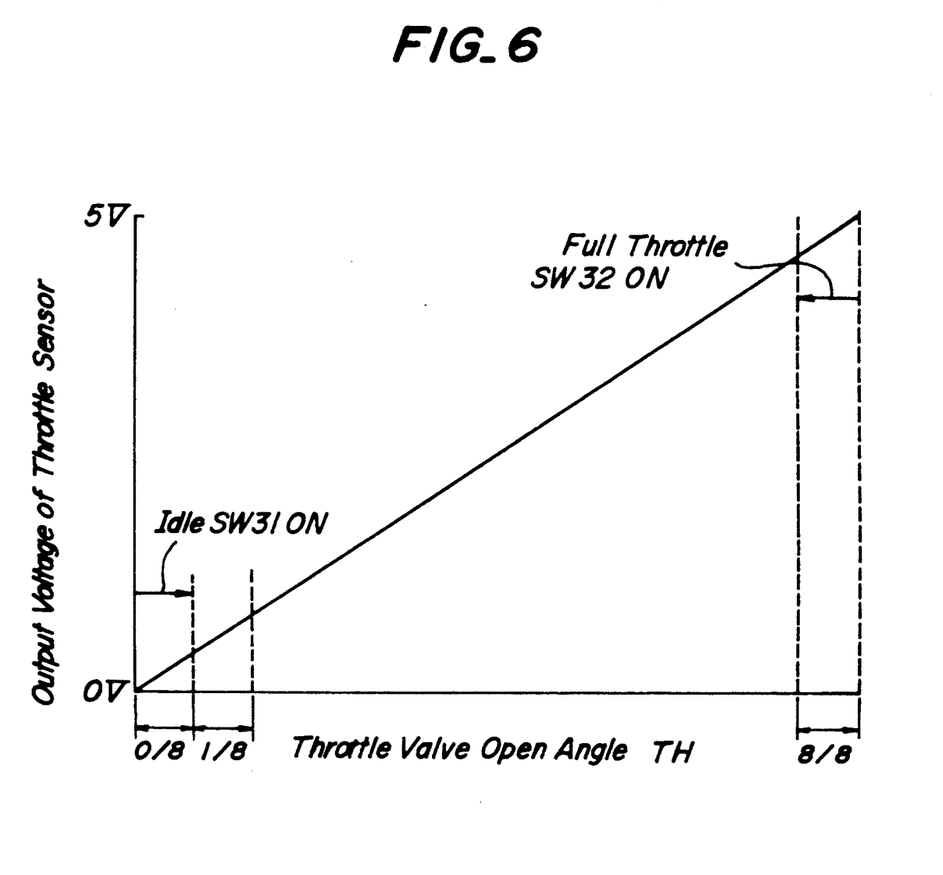
FIG. 6 is a graph showing a relation between the throttle valve open angle and the output of the throttle sensor.

Then, in a next step 105, a treatment is performed in accordance with the judgement result. That is to say, in the present embodiment, the output five bit number generated by SECU 60 indicates the operational conditions of the sensors 31 to 35, so that one or two abnormal sensors may be easily displayed. Moreover, in the present embodiment, since normally operating sensors can be specified, it is possible to derive a correct condition signal to be generated by an abnormal sensor from condition signals produced by other normal sensors. For instance, in a situation No. 14 in which the idle switch 31 and intake air flow meter 34 are judged to be out of order, a correct intake air flow rate Q can be estimated from the condition signals generated by the throttle sensor 33 and engine running speed sensor 36 with reference to characteristic curves shown in FIG. 4, in which the horizontal axis denotes the engine running speed $N_E$ and the vertical axis represents the intake air flow rate Q, while the throttle valve open angle TH(=0/8~8/8) is taken as a parameter. For instance, when the engine running speed detected by the sensor 36 is 4000 rpm and the throttle sensor 33 generates a throttle valve open angle TH=4/8, then it is estimated that the intake air flow rate Q is 2000. Moreover, when the idle switch 31 and/or full throttle switch 32 are judged to be out of order, but the throttle sensor 33 is judged to be normal, a correct condition signal of the idle switch 31 can be derived from a characteristic curve illustrated in FIG. 6, which represents a relation between the throttle valve open angle TH and an output voltage of the throttle sensor 33 which is usually formed by a potentiometer. That is to say, when the output voltage of the throttle sensor 33 is in a range $V_C$, it is judged that the throttle valve is fully closed and thus the idle switch 31 is in on-state, so that a correct condition signal of the idle switch is presumed to be logic "0". When the output voltage is in a range $V_0$, the throttle valve is assumed to be fully opened and thus the full throttle switch 32 is in on-state, so that a correct condition signal of the full throttle switch 32 is logic "1". In this manner, one or two correct condition signals to be generated by one or two sensors which are judged to be abnormal can be derived from condition signals which are produced by sensors which are judged to operate normally.

Figure 5:
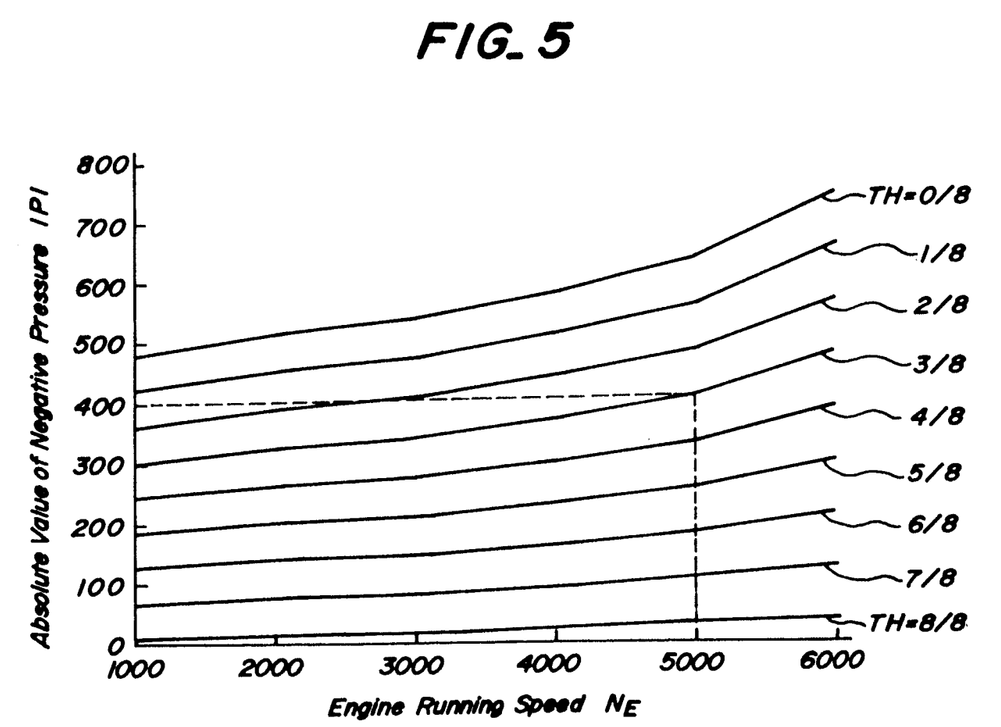
FIG. 5 is a graph illustrating characteristic curves of the engine.

FIG. 5 shows characteristic curves representing the relation between the engine running speed $N_E$ and the absolute value $|P|$ of the negative pressure in the intake manifold, while the throttle valve open angle TH is taken as a parameter. When it is judged that the pressure sensor 35 is out of order as in a case of a situation No. 2, a correct pressure value can be derived from the engine running speed and throttle valve open angle with reference to the characteristic curves shown in FIG. 5. For instance, when the engine running speed is 5000 rpm and the throttle valve open angle TH is 3/8, then a correct absolute value $|P|$ within the intake manifold can be estimated to be 400.

Figure 4:
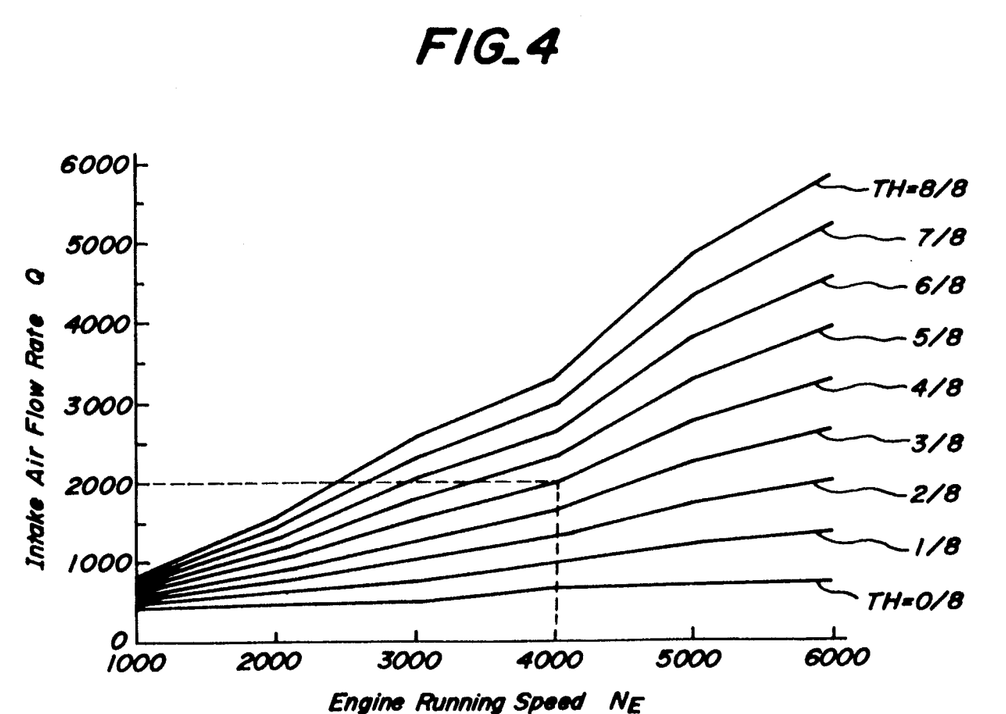
FIG. 4 is a graph representing characteristic curves of electronically the controlled engine.

In a situation No. 6 in which it is judged that the throttle angle sensor 33 and pressure sensor 35 are out of order, at first a correct throttle valve open angle TH is estimated from the characteristic curves shown in FIG. 4. Then, a correct absolute value of the negative pressure $|P|$ is derived from the thus estimated correct throttle valve open angle and the known engine running speed with reference to the characteristic curves shown in FIG. 5.

In the manner explained above, according to the invention one or two correct condition signals which are to be generated by one or two sensors which are judged to be abnormal can be derived or estimated from condition signals actually generated by three or four sensors which are judged to be normal. Then, desired controlling operations are performed by using the thus derived correct condition signals instead of the actual condition signals. For instance, in a situation No. 14, a control for cutting a fuel supply to the engine can be carried out by using the throttle vale open angle signal instead of the idle switch signal, and a control for adjusting an amount of the fuel to be supplied to the engine can be performed by using the throttle valve open angle signal and engine running speed signal instead of the intake air flow rate signal. In this case, SECU 60 sends necessary information to ECCS 10 or other electronic control units via the communication circuit 70.

As explained above, in the present embodiment, SECU 60 receives the status data produced by ECCU 10 and ATCU 20 on the basis of the condition signals generated by the sensors 31 to 36 and form an input five bit number. Then the input five bit number is retrieved on the table which includes a number of situations each being composed of an input five bit number and an output five bit number, and an output five bit number of a retrieved situation in the table is read out as a judgement result. In the table, the output five bit numbers are formed by processing a plurality of status data in combination in accordance with the majority decision. Therefore, the failure detecting reliability can be improved to a great extent. Further as compared with a case in which the condition signals are directly supplied to SECU 60 from the sensors 31 to 36, the capacity of the harness can be decreased. In a modification of the present embodiment, the condition signals may be supplied from ECCU 10 and ATCU 20 to SECU 60 and the status data may be formed by SECU.

Figure 7:
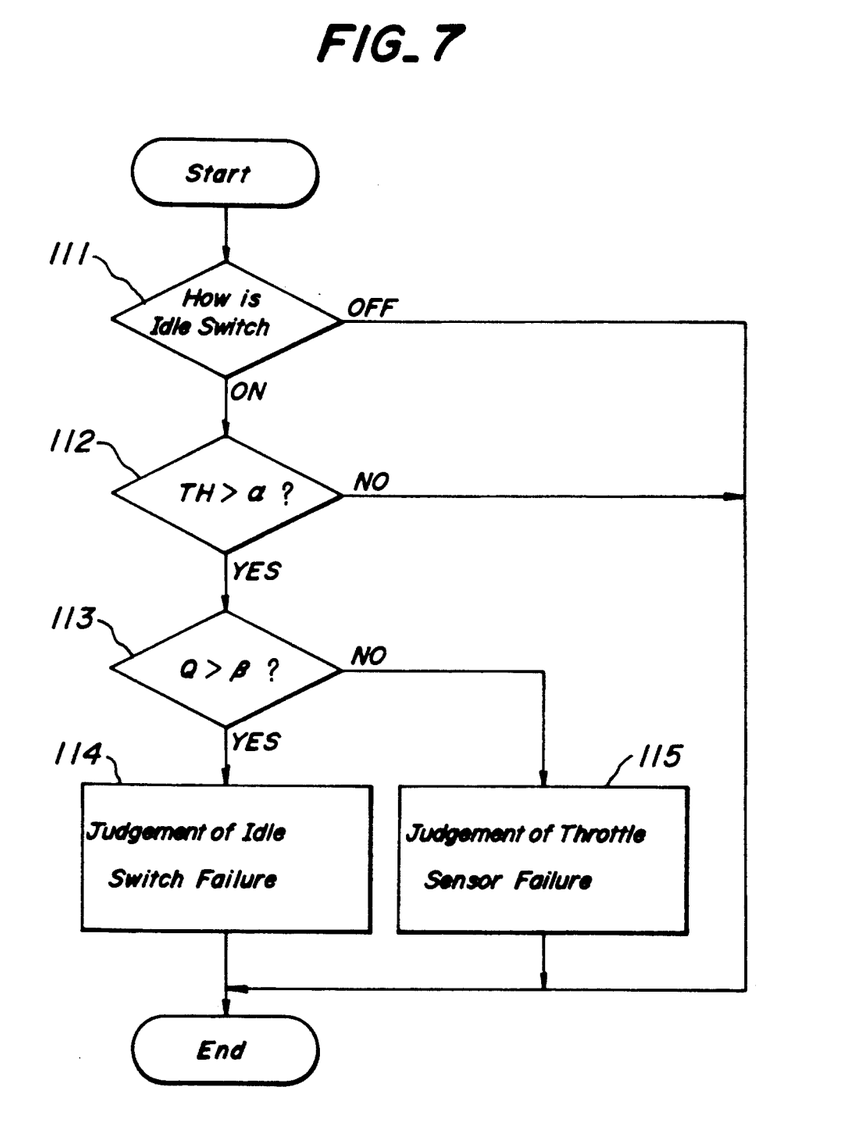
FIG. 7 is a flow chart representing the operation of another embodiment of the automotive vehicle controlling apparatus according to the invention.

FIG. 7 is a flow chart expressing the operation program of another embodiment of the controlling apparatus according to the invention. In this embodiment, the construction is same as that of the first embodiment illustrated in FIG. 2. As shown in FIG. 7, the failure judging operation is executed at a regular time interruption. In a first step 111, the condition signal generated by the idle switch 31 is checked. When it is determined that the idle switch 31 is in the on-state, then in a step 112 it is checked whether the condition signal generated by the throttle sensor 33 exceeds a predetermined threshold value $\alpha$. If YES (TH>$\alpha$), it is judged that the idle switch is in the on-state, although the throttle valve open angle is large. This decision is apparently erroneous, so that it can be presumed that either one of the idle switch 31 and throttle sensor 33 is out of order. Therefore, in a step 113, it is checked whether the condition signal generated by the intake air flow meter 34 exceeds a predetermined threshold value $\beta$. If YES (Q>$\beta$), it can be judged that the idle switch 31 is abnormal in a step 114, and if NO (Q$\leq\beta$), the throttle sensor 33 can be judged to be out of order in a step 115. In this process, the judgements in the steps 114 and 115 may be considered as a kind of the majority decision. If the idle switch 31 is opened (OFF in the step 111), and the throttle valve open angle TH is not larger than the threshold value $\alpha$ (NO in the step 112), it is no more possible to effect further judgement, so that the judgement program is ended. In this manner, according to the present embodiment, the malfunction of the idle switch 31 and throttle sensor 33 can be judged accurately from the condition signals supplied from the sensors 31 to 35.

As explained above in detail, in the automotive vehicle controlling apparatus according to the present invention, the managing unit which performs the failure judgement by processing the condition signals generated by the sensors in combination is provided separately from the control units, and thus the failure judgement can be performed accurately and a possibility of erroneous judgement can be reduced. Further, when it is judged that one or more sensors are out of order, the managing unit can estimate one or more correct condition signals to be generated by these sensors from condition signals produced by sensors which are judged to operate normally.

What is claimed is:

1. An automotive vehicle controlling apparatus with failure judging faculty comprising:
    sensing means, including a plurality of sensors, for detecting operational conditions of the automotive vehicle to generate a plurality of condition signals;
    signal processing means, including at least one control unit, for receiving and processing at least one of said plurality of condition signals and for generating at least one control signal;
    actuating means, including at least one actuator, for controlling the automotive vehicle in response to said at least one control signal generated by said signal processing means; and
    managing means for receiving information related to said plurality of condition signals generated by said sensing means and for processing the information to judge a failure of at least one sensor in the sensing means and/or at least one actuator in the actuating means,
    said managing means further providing at least one correct condition signal related to at least one sensor which is judged to be abnormal, said correct condition signal being derived from condition signals generated by sensors which are judged to be normal.

2. An apparatus according to claim 1, wherein said managing means is directly connected to said sensors in the sensing means to receive the condition signals generated by the sensors, and the managing means is constructed to form said information from the condition signals.

3. An apparatus according to claim 1, wherein said at least one control unit is constructed to form said information in accordance with the condition signals generated by said sensors and said managing means is connected to said at least one control unit in the signal processing means by means of at least one communication circuit to receive said information.

4. An apparatus according to claim 1, wherein said managing means is constructed such that a failure judgement result is derived by processing said information in accordance with a predetermined logic theory.

5. An automotive vehicle controlling apparatus with failure judging faculty comprising:
    sensing means, including a plurality of sensors, for detecting operational conditions of the automotive vehicle and for generating a plurality of condition signals;
    signal processing means, including at least one control unit, for receiving and processing at least one of said plurality of condition signals and for generating at least one control signal;
    actuating means, including at least one actuator, for controlling the automotive vehicle in response to said at least one control signal generated by said signal processing means; and
    managing means for receiving information related to said plurality of condition signals generated by said sensing means and for processing the information to judge a failure of at least one sensor in the sensing means and/or at least one actuator in the actuating means,
    wherein said managing means is constructed such that a failure judgement result is derived by processing said information in accordance with a majority decision.

6. An automotive vehicle controlling apparatus with failure judging faculty comprising:
    sensing means, including a plurality of sensors, for detecting operational conditions of the automotive vehicle to generate a plurality of condition signals;
    signal processing means, including at least one control unit, for receiving and processing at least one of said plurality of condition signals and for generating at least one control signal;
    actuating means, including at least one actuator, for controlling the automotive vehicle in response to said at least one control signal generated by said signal processing means; and
    managing means for receiving information related to said plurality of condition signals generated by said sensing means and for processing the information to judge a failure of at least one sensor in the sensing means and/or at least one actuator in the actuating means, wherein said sensing means includes an idle switch for detecting a fully closed condition of a throttle valve to generate an idle signal, a full throttle switch for detecting a fully opened condition of the throttle valve to produce a full throttle signal, a throttle sensor for detecting a throttle valve open angle to generate a throttle valve open angle signal, an intake air flow meter for detecting a flow rate of an intake air to produce an intake air flow rate signal, a pressure sensor for detecting a negative pressure within an intake manifold collector to produce a negative pressure signal, and an engine running speed sensor for detecting a running speed of an engine of the automotive vehicle to produce an engine running speed signal;

said signal processing means includes an engine control unit for generating engine control signals for controlling the engine, and an automatic transmission control unit for generating automatic transmission control signals for controlling an automatic transmission;

said actuating means includes an engine controlling actuator group for controlling the engine in response to the engine control signals generated by said engine control unit, and an automatic transmission controlling actuator group for controlling the automatic transmission in response to said automatic transmission control signals; and said managing means is constructed to detect at least one sensor which is out of order by processing said idle signal, full throttle signal, throttle valve open angle signal, intake air flow rate signal and negative pressure signal in combination.

7. An apparatus according to claim 6, wherein said managing means is constructed such that an input five bit number consisting of five bit status data which represent statuses of said idle signal, full throttle signal, throttle valve open angle signal, intake air flow rate signal and negative pressure signal is formed, the thus formed input five bit number is retrieved on a table which contains all possible situations of input five bit numbers and output five bit numbers which are obtained by totally judging statuses of the input five bit numbers, and an output five bit number contained in a retrieved situation is read out as a judgement result.

8. An apparatus according to claim 7, wherein said managing means is constructed such that said output five bit numbers are obtained by processing the five bit status data in accordance with a majority decision.

9. An apparatus according to claim 7, wherein said managing means is constructed such that said output five bit numbers are derived by processing the five bit status data in accordance with a given logic theory.

10. An apparatus according to claim 6, wherein said managing means is constructed such that when at least one sensor is judged to be out of order, a correct condition signal to be generated by said at least one sensor which is judged to be out of order is derived from condition signals which are generated by sensors which are judged to be normal.

11. An apparatus according to claim 10, wherein said managing means is constructed such that when said intake-air rate sensor is detected to be out of order, a correct value of the intake-air rate is derived from the throttle valve open angle signal and the engine running speed signal.

12. An apparatus according to claim 10, wherein said managing means is constructed such that when said pressure sensor is judged to be out of order, a correct pressure value is derived from the throttle valve open angle signal and the engine running speed signal.

13. An apparatus according to claim 10, wherein said managing means is constructed such that when said idle switch is judged to be abnormal, a correct full close signal is derived from the throttle valve open angle signal.

14. An apparatus according to claim 10, wherein said managing means is constructed such that when said full throttle switch is judged to be out of order, a correct full-open signal is derived from the throttle valve open angle signal.

15. An apparatus according to claim 10, wherein said managing means is constructed such that when said idle switch and full throttle switch are judged to be out of order, a correct idle throttle signal and a correct full throttle signal are derived from the throttle valve open angle signal.

16. An apparatus according to claim 10, wherein said managing means is constructed such that when said throttle sensor is judged t be out of order, a correct throttle valve open angle signal is derived from either one of the intake-air rate signal and negative pressure signal.

17. An apparatus according to claim 10, wherein said managing means is constructed such that when said throttle sensor and negative pressure sensor is judged to be out of order, at first a correct throttle valve open angle signal is derived from the intake-air rate and engine running speed, and then a correct negative pressure value is derived from the thus derived throttle valve open angle signal and engine running speed signal.

18. An apparatus according to claim 6, wherein said managing means is constructed such that the failure judgement result is obtained by checking whether the idle switch is closed or opened, checking whether the throttle valve open angle signal is larger than a predetermined first threshold value when the idle switch is in the on-state, checking whether the intake air flow rate is larger than a predetermined second threshold value when the throttle valve open angle signal is larger than the first threshold value, determining the failure of the idle switch when the intake air flow rate is larger than a second threshold value, and determining a failure of the throttle sensor when the intake air flow rate is equal to or smaller than the second threshold value.

* * * * *